April 29, 1969   L. M. MORSE   3,441,051
CHECK VALVE
Filed June 3, 1965

INVENTOR

LESTER M. MORSE

BY McLean, Morton and Boustead

ATTORNEYS.

3,441,051
CHECK VALVE
Lester M. Morse, Hammond, Ind., assignor to Sinclair Research Inc., New York, N.Y., a corporation of Delaware
Filed June 3, 1965, Ser. No. 461,141
Int. Cl. F16k 15/00, 17/00
U.S. Cl. 137—516.25              4 Claims

ABSTRACT OF THE DISCLOSURE

A check valve capable of withstanding high back pressures, in the order of 15,000 p.s.i., without leakage. A valve seat depression in a plane surface of the first member leads to a fluid entrance path through that first member. A second member, having a fluid exit path through it, is coupled to the first member so that the fluid entrance path, the valve chamber and the fluid exit path are coaxial. A poppet valve, within the valve seat depression, has an alignment member extending within and coaxial with the fluid entrance path. A resilient pad covers the upper surface of the poppet valve and a portion of the first member plane surface. A retaining member holds the resilient pad in position and includes an alignment member extending within and coaxial with the fluid exit path. A spring can be provided to bias the pad against the poppet valve plane surface.

---

This invention pertains to an improved check valve which can withstand extremely high back-pressures of up to about 15,000 p.s.i. or more with out back leakage. The improved chack valve of this invention is of simple but rugged construction.

The novel check valve of this invention derives its superior characteristics from a combination of two sealing means. The first means comprises a poppet carefully machined for mating relation with a seat. The valve seat is contained within a member having a smooth flat surface and the seat usually comprises a depression in this surface which leads to a fluid entrance duct. The poppet is congruent to the depression in the surface of the seating means. Thus it will have intimate contact with the seat in the closed position and its surface, remote from the seat, will comprise a flat surface flush with the surface of the seating member, the surfaces meeting at a fine line.

The second sealing means provided by the valve of this invention is a cover for the juncture of the poppet and seat member. Thus the poppet need not be relied on alone to obtain an absolutely tight shut-off and prevent fluid from entering between the poppet and the seat to cause backleaking of the check valve. The second sealing effect is obtained from a resilient disk which covers the fine line of contact between the seat and poppet. Since this line of contact usually amounts to but a hair line, the resilient member cannot be extruded when a high pressure differential exists across the valve. The resilient disk is generally held in position by a guided retainer and may be loaded by a spring to hold it against the poppet and the seat body.

The invention will be better understood by reference to the accompanying drawings in which FIGURE 1 is a longitudinal cross-sectional view of the novel valve of this invention;

Figure 1:
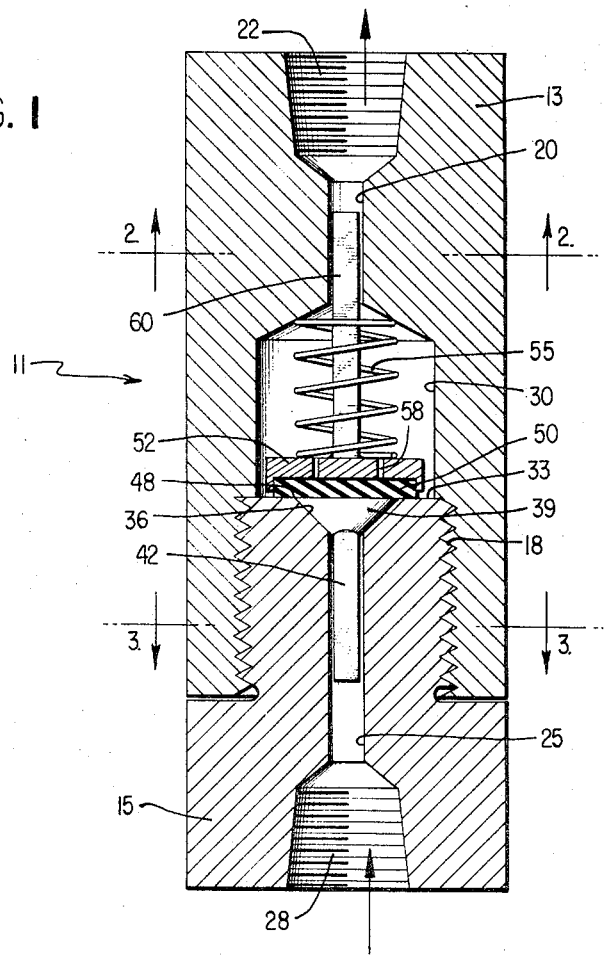
Figure 2:
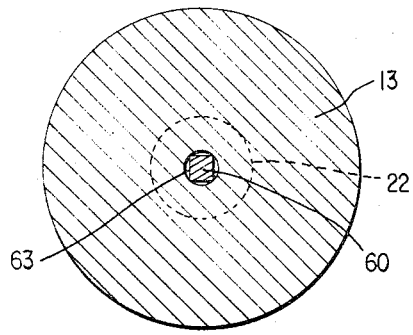
FIGURE 2 is a cross-sectional view along the line 2—2 of FIGURE 1.

In the drawings, the valve 11 generally comprises an upper case portion 13 and a lower case portion 15 which may be fixedly or removably joined to each other by any known means, for example, the threads 18. Upper case portion 13 is provided with the generally central bore 20 which provides a fluid exit and which may open to the flared portion 22 which, as shown, may be suitably threaded or otherwise provided for coupling to a fluid duct. Likewise, lower case portion 15 has the central bore 25 which acts as a fluid entrance and which opens to the flared lower portion 28 which also may be suitably threaded. As shown, upper portion 13 contains the valve chamber 30.

Figure 3:
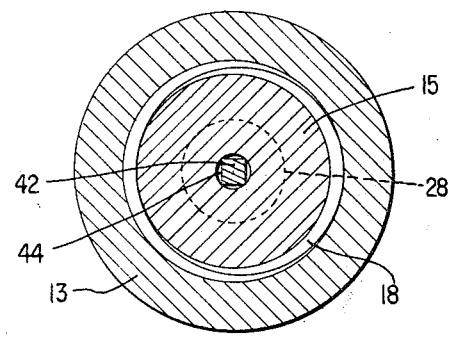
FIGURE 3 is a cross-sectional view along the line 3—3 of FIGURE 1.

The upper surface 33 of lower portion 15 is flat and, as shown, a seat 36 is provided by a depression in this surface for the poppet 39. It is important that seat 36 and poppet 39 conform as exactly as possible to each other. The poppet 39 is fastened to the elongated guide 42 which extends into the bore 25. As can be more clearly seen in FIGURE 3, guide 42 and bore 25 are so related to each other that at least one passage 44 is left between them for fluid flow in the direction shown by the arrows of FIGURE 1. Conveniently this is done as illustrated by having bore 25 round in cross-section while guide 42 is square or rectangular.

The generally circular line 48 where the surface 33 meets the upper surface of poppet 39 is covered, when the valve is closed, by the resilient pad 50. This pad preferably is disk-shaped and may be made of rubber or other suitably resilient material. This pad is held by the retainer 52, which, as illustrated, may be lightly biased to the closed position by spring 55. The retainer may be provided with one or more holes 58 for equalization of pressure on disk 50. The retainer 52 is supported on the guide 60; once more, the shape of guide 60 and bore 20 is such as to provide a fluid flow passage, e.g. 63.

The valve of this invention was used in the hydraulic testing of a pressure vessel wherein a pressure of 15,000 p.s.i. was applied. Due to the interaction between the two sealing means, the carefully machined poppet and seat which provide a good seal and also by their flush upper surfaces provide a firm seat for the resilient sealing means, the valve of this invention performed its function with no trace of leakage. Several commercially available valves were also tested but were found to be unsuitable due to leakage at the high pressure.

It is claimed:
1. A check valve suitable for withstanding high back pressures without leakage comprising a valve seat member having a plane surface and a seat depression in said plane surface leading to a fluid entrance path; a second member having a fluid exit path therethrough and coupled to said valve seat member to define a valve chamber including said seat depression, said valve chamber coaxial with said fluid entrance path and said fluid exit path; a poppet valve mating closely with said seat depression and having a plane surface flush with said seat member plane surface and meeting said seat member plane surface at a fine line in the closed position; a resilient member adjacent the plane surface of said poppet valve and covering at least said fine line when the poppet valve is in the closed position; and retaining means extending at least over the top of said resilient member for holding said resilient member over said poppet valve, said retaining means provided with one or more holes extending throughout its thickness to provide for equalization of back pressure on the resilient member and having a guide member extending within and coaxial with said fluid exit path.

2. The valve of claim 1 in which the poppet is fastened to a guide member contained within said fluid entrance path.

3. The valve of claim 1 further including biasing means for urging the resilient member into contact with the plane surface of said poppet valve.

4. A check valve for controlling fluid flow comprising:
A first member having:
    (a) A plane surface with a seat depression in said plane surface, and
    (b) A fluid entrance passageway passing through said first member from said seat depression;
A second member having a fluid exit passageway therethrough and coupled to said first member to define a valve chamber including said seat depression, said valve chamber coaxial with said fluid entrance passageway and said fluid exit passageway;
A poppet valve within said seat depression and including a first alignment means extending into said fluid entrance passageway, said poppet valve adapted to assume a closed position and an open position, said poppet valve including a mating surface and a plane surface, said mating surface sealingly meeting said seat depression when said poppet valve is in said closed position, said poppet valve plane surface forming a flush surface with said first member plane surface when said poppet valve is in said closed position;
A resilient member adjacent said poppet valve plane surface;
Retaining means extending at least over the top of said resilient member, including a second alignment means extending within and coaxial with said fluid exit passageway, for retaining said resilient member in a position overlaying said poppet valve plane surface and at least a portion of said first member plane surface, said retaining means provided with one or more holes extending throughout its thickness to provide for equalization of back pressure on the resilient member; and
Biasing means for urging said resilient member into contact with said poppet valve plane surface.

References Cited

UNITED STATES PATENTS

| | | | |
|---|---|---|---|
| 168,192 | 9/1875 | Smith et al. | 137—533.25 X |
| 2,943,639 | 7/1960 | Smith | 137—533.25 X |

WILLIAM F. O'DEA, *Primary Examiner.*

DAVID J. ZOBKIW, *Assistant Examiner.*

U.S. Cl. X.R.

137—533.25; 251—332